Figure 1:
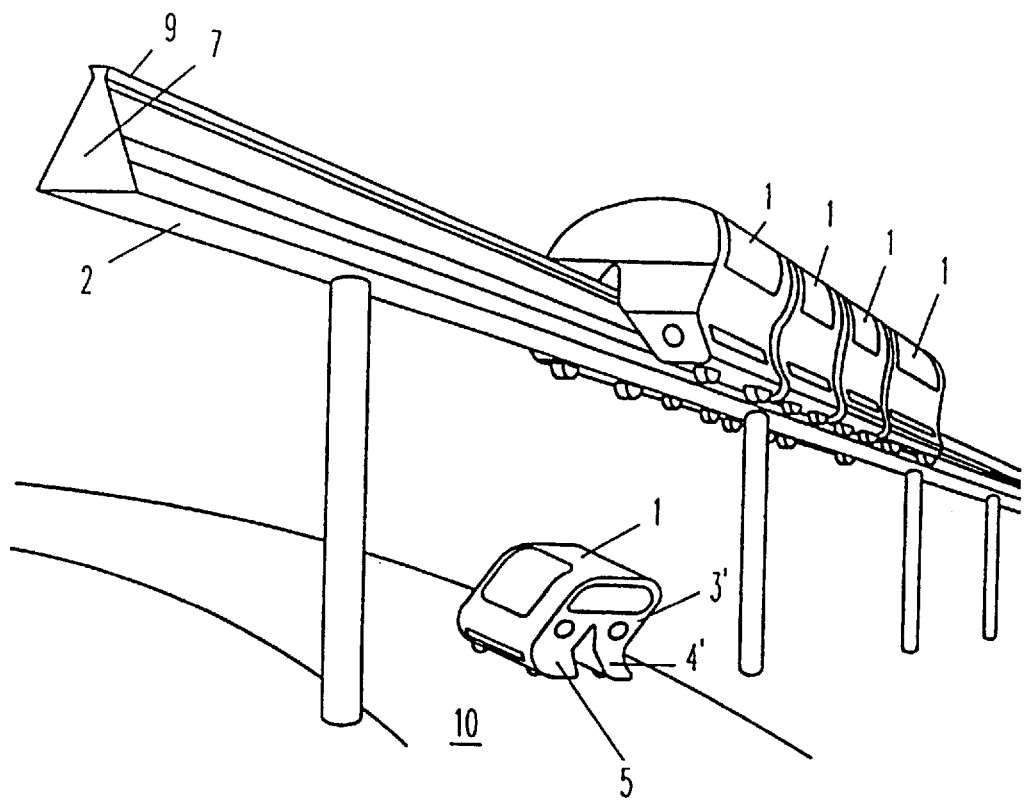

United States Patent [19]
Jensen

[11] Patent Number: 5,813,349
[45] Date of Patent: Sep. 29, 1998

[54] TRANSPORT SYSTEM COMPRISING A DUAL-MODE VEHICLE AND PLATFORM LAYOUT FOR SAID SYSTEM

[76] Inventor: Palle Rasmus Jensen, Forhåbningsholms All´´30, Frederiksberg C, Denmark, 1904

[21] Appl. No.: 809,309

[22] PCT Filed: Sep. 14, 1995

[86] PCT No.: PCT/DK95/00367

§ 371 Date: Mar. 12, 1997

§ 102(e) Date: Mar. 12, 1997

[87] PCT Pub. No.: WO96/08401

PCT Pub. Date: Mar. 21, 1996

[30]     Foreign Application Priority Data

Sep. 14, 1994  [DK]   Denmark .................................. 1052/94

[51] Int. Cl.⁶ ...................................................... B61B 1/00
[52] U.S. Cl. .............................. 104/28; 104/30; 104/118; 104/88.03; 105/72.2
[58] Field of Search ................................. 104/27, 28, 30, 104/118, 124, 88.03, 88.05; 105/72.2, 329.1, 332, 341, 397, 141, 149.1; 296/178, 179

[56]             References Cited

U.S. PATENT DOCUMENTS

| | | | |
|---|---|---|---|
| 1,798,011 | 3/1931 | Cernuda ................................... | 296/178 |
| 3,225,704 | 12/1965 | Gilvar et al. . | |
| 3,397,649 | 8/1968 | Pfeffer . | |
| 3,447,481 | 6/1969 | Gorham . | |
| 3,497,027 | 2/1970 | Wild . | |
| 3,515,074 | 6/1970 | Helbig ....................................... | 104/28 |
| 3,675,584 | 7/1972 | Hall ........................................... | 104/28 |
| 3,677,188 | 7/1972 | Bordes ................................. | 105/149.1 |
| 3,797,600 | 3/1974 | Miner .................................. | 180/64 M |
| 4,027,596 | 6/1977 | Nardozzi .................................... | 104/28 |
| 4,216,839 | 8/1980 | Gould et al. .......................... | 180/65 R |
| 4,339,015 | 7/1982 | Fowkes et al. ........................ | 180/65 R |
| 4,582,354 | 4/1986 | Halim ....................................... | 296/178 |
| 4,923,025 | 5/1990 | Ellers ...................................... | 180/65.2 |
| 5,176,082 | 1/1993 | Chun et al. ............................... | 104/28 |
| 5,245,930 | 9/1993 | Williams ................................... | 104/27 |
| 5,253,589 | 10/1993 | Kawanishi et al. ....................... | 104/28 |
| 5,473,233 | 12/1995 | Stull et al. ................................ | 104/27 |
| 5,669,588 | 9/1997 | Goldsmith ................................. | 104/28 |

FOREIGN PATENT DOCUMENTS

| | | |
|---|---|---|
| 4032-605-A | 3/1992 | Germany . |
| WO 91/18777 | 12/1991 | WIPO . |
| WO 93/11016 | 6/1993 | WIPO . |
| WO 94/21479 | 9/1994 | WIPO . |

*Primary Examiner*—Mark Tuan Le
*Attorney, Agent, or Firm*—Dick & Harris

[57]               ABSTRACT

A transport system comprises a number of dual-mode vehicles (11) and a number of station systems (31). Each of the dual-mode vehicles (11) accommodates a number of passengers, such as, for example ten passengers. Each station system (31) comprises a number of platforms (32) each with a roadway section (36) configured as a ramp on which vehicles are guided forward by electronic control. Each of the platforms (32) are raised above the roadway. The roadway includes barriers (34) with an opening (35) on each side for the admission of a stationary vehicle (11) which has openable doors on each side of the vehicle which can provide admission to all seats simultaneously.

4 Claims, 3 Drawing Sheets

TRANSPORT SYSTEM COMPRISING A DUAL-MODE VEHICLE AND PLATFORM LAYOUT FOR SAID SYSTEM

BACKGROUND OF THE INVENTION

The invention relates to a transport system having dual-mode vehicles in the form of electrically driven vehicles which can be driven forward by built-in batteries or can be powered by a supply from a running rail or the like. The vehicles have wheels for driving on a roadway or the like and means for driving on a rail. The rail driving means include a substantially triangular cross-sectional profile pointing one of the corners upwards and the vehicle has a downward facing through-going notch in the longitudinal direction. The notch has a cross-sectional profile substantially corresponding to that of the rail. The vehicle comprises at least one door at each side for facilitating occupancy of the vehicle, when it is stationary.

International patent application no. PCT/DK91/00146 incorporated herein by reference describes a transport system of the dual-mode type and having dual-mode vehicles which can drive on a triangular rail individually or coupled together and as an individual electric car on an ordinary road.

Vehicles of the type described in the above application are usually adapted for transportation of two persons, a driver and a passenger. The vehicle can be driven manually as an electric car on an ordinary road section but it can also be driven by electronic control, as explained in the application, if the means necessary are provided in the road surface. The traffic on the triangular rail is usually automatically controlled, and if possible the vehicles are coupled together in a column to save energy.

Figure 2:
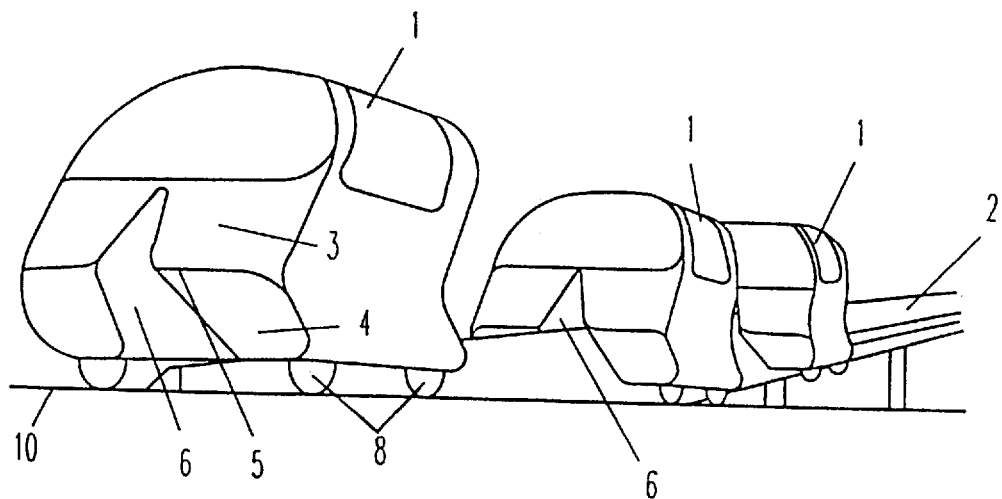

The main component of the transport system is the vehicle 1 as shown in FIGS. 1 and 2 of the drawing, which drives on a rail 2 having a triangular cross-sectional profile 7 and usually a special brake rail 9 on top of the rail 2. The triangular rail is placed with one of its points directed upwards. Also, each vehicle is provided with ordinary wheels 8 for roadway driving.

Each vehicle has a front and a rear end where for example the front end has two substantially plane surfaces 3, 4 forming an angle along a horizontal line 5, and where the rear end has two substantially plane surfaces 3', 4' likewise joining along a horizontal line as shown, and as explained in the above international application.

FIG. 2 illustrates how the dual-mode vehicle 1 is transferred from rail traffic, receiving power from the rail, to the roadway 10 as an individual, electric vehicle with wheels 8, receiving power from brought-along batteries.

In the longitudinal direction the vehicle has a downwardly directed, through-going notch 6 with a cross-sectional profile which corresponds substantially to the cross-sectional profile 7 of the rail 2.

The vehicle and the configuration of the vehicle as well as the rail 2 and the configuration of the rail will not be explained in detail in the present application, reference being made to the above international application.

When the vehicle 1 leaves the triangular rail it drives as an electric car with a limited range determined by the capacity of the built-in battery/batteries.

EXPLANATION OF THE INVENTION

In order to increase the capacity of the transport system it can be configured so that the vehicle can accommodate a number of passengers at a time. Thus, the vehicle comprises two longitudinally extending rows of seats, one row at each side of the notch, and that each door has such extent in the longitudinal direction of the vehicle that admission can be provided to all seats on the side in question when the train stops at a station system.

A transport system is provided which can accommodate several persons simultaneously, especially persons travelling the same stretch or partial stretch and in the same way as travelling by bus or train, but maintaining the majority of the advantages of the transport system according to the above international application.

U.S. Pat. No. 3,447,481 describes a transport system which is configured to receive multiple passengers. However some of the disadvantages of the conventional bus or train systems still prevail, among these comparatively long waits at each platform for boarding and alighting. With the transport system according to the invention a further development of the transport system according to the above international application is obtained, so that the possibility of using vehicles capable of accommodating a number of seated passengers in each vehicle is provided without interfering with the transport system in such a manner that undesirable situations arise which reduce the advantages and the efficiency of the system.

By configuring the transport system according to the invention with a vehicle as disclosed, boarding and alighting is made easy as all passengers can step directly out onto the platform or they can enter freely into the vehicle. Hereby an extremely low consumption of time is obtained for filling and/or emptying the vehicle. Consequently, the vehicle needs only to stop briefly at the platform.

The vehicle is preferably adapted to drive directly, i.e. without stopping, from one station to another so that all passengers leave the vehicle when the doors open. The individual vehicles are coupled together in train units controlled by the electronic control system which may comprise rules for passenger traffic.

The transport system according to the invention also comprises a special station system with a number of platforms. The possibility is hereby provided for guiding the passengers to and from the vehicle quickly and safely in a controlled manner so that the vehicle only needs to stop briefly. Subsequently, the vehicle leaves the platform again and is led out to the rail system, either individually or to be coupled together with other vehicles for the formation of a train.

The station system with a number of platforms being parallel also has the advantage that the station cannot be blocked if a vehicle is unable to continue. for example due to a defect, if one or more passengers cannot or will not alight or if the vehicle is held back for other reasons delays for the rest of the vehicles are avoided.

By configuring the transport system to include barriers the safety is significantly increased as the further barriers ensure both that there are no passengers on the platform until the vehicle is stationary and that new passengers are not admitted to the platform until the passengers leaving the vehicle have left it.

THE DRAWING

Figure 3:
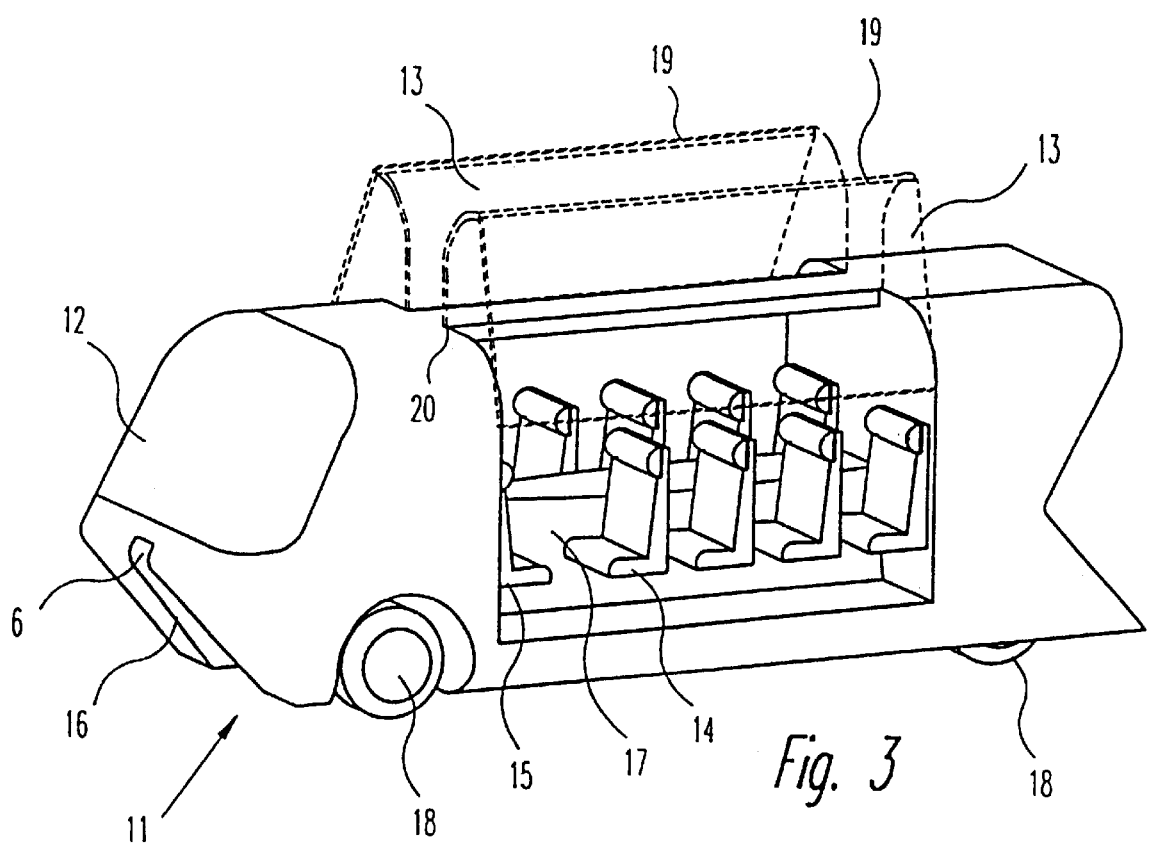
Figure 4:
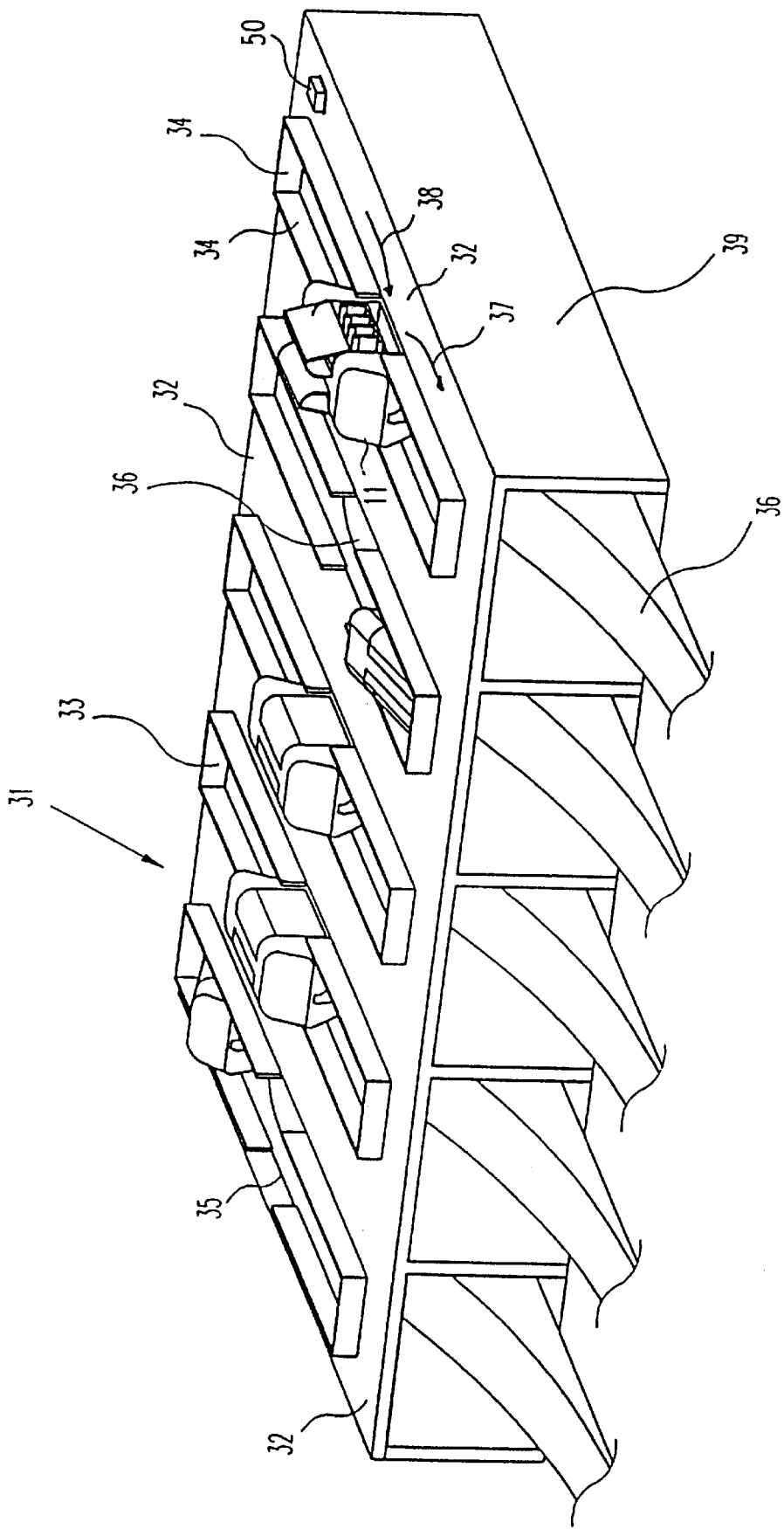

The invention is explained in closer detail below with reference to the drawing, wherein FIG. 1 shows a known dual-mode vehicle designed both as a vehicle moving on rails and as a roadway vehicle, FIG. 2 shows the vehicle in FIG. 1 in the transitional phase from rail traffic to road traffic, FIG. 3 shows the dual-mode vehicle for the transport system according to the invention, and FIG. 4 is a principle drawing showing a station layout with a number of platforms for the transport system according to the invention.

EXPLANATION OF THE EMBODIMENT EXAMPLE

FIGS. 1 and 2 of the drawings disclose a prior-art dual-mode transportation vehicle.

The dual-mode vehicle 11 in the improved system according to the invention and as shown in FIG. 3 is configured with a front and a rear end of substantially the same shape and function as explained in connection with the system as shown an explained in connection with FIGS. 1 and 2, but the vehicle is considerably larger. However, the front end can be configured with a window 12 as shown. The vehicle is for example approx. 6 m long and can accommodate ten seated passengers. For the maximum number of ten passengers there are ten seats placed in two rows with five seats 14 at each side of a central console covering the through-going notch 16 having a triangular cross-sectional profile so that the vehicle can drive on the rail system as shown in FIGS. 1 and 2. The central console 17 is slightly wider at the centre of the vehicle than at the ends in order to permit curves of the rail. As a result, the widest seats are at the front and at the rear.

Additionally, the vehicle has wheels 18 for roadway traffic and especially for traffic in connection with the station system which will be explained later. Moreover, the vehicle 11 can drive in the same way as the vehicle 1 shown in FIGS. 1 and 2.

The doors are hinged at the top of the vehicle by means of a longitudinally extending hinge 20 and can be configured as shown in FIG. 3 with a further longitudinally extending hinge 19. There is a door at each side placed symmetrically about the median plane of the vehicle. When the doors open as shown in FIG. 3, all passengers can step directly out onto the platform and new passengers can enter the vehicle directly. However, in certain situations it may be advantageous that there is one door per seat so that only the door/doors next to the passengers who are to alight will open, for example if a vehicle is operating as a so-called telebus.

FIG. 4 shows a station layout 31 having a number of platforms 32, each being raised above a roadway section configured as a hill or a double ramp 36 screened from the surroundings by barriers 34 at each platform. In each side of the barriers 34 there is an opening 35 at the top of the hill or double ramp 36. These openings are not much larger than the opening which appears in a vehicle when the door is opened.

The platforms 32 may be raised by means of concrete walls 39 or the like, in connection with which it should be pointed out that FIG. 4 is simply a principle drawing.

Each platform 32 has an area at each side of each vehicle rendering free access to both sides of the vehicle.

Furthermore, each platform comprises additional barriers (not shown in the drawing) barring the platform or at least the area around each opening 35 on a platform, thus preventing admission to the area immediately in front of each opening 35 so as to ensure that no passengers or other persons stand close to the openings 35 before a vehicle is stationary covering the opening. By means of these additional barriers, which are arranged with doors or the like, it is possible to control boarding and alighting of the vehicle. When the vehicle is stationary the doors on both sides open. All passengers can step directly out onto the platform and leave in the same direction, for example in the direction shown by the arrow 37. Immediately after new passengers are admitted to the platform as the mentioned additional barriers are opened so that the passengers, for example following the direction shown by the arrow 38, can enter and get seated in the vehicle.

As the passengers have beforehand informed the electronic control system of their destination and have paid the required fare, for example by means of a "smart card", signs or the like before and at the additional barriers will show the passengers which vehicle they are supposed to board in order to reach their destination.

When the vehicles, for example forming a column and driving on the triangular rail, reaches the station system the vehicles are separated and they drive individually into each their platform as the system comprises a number of platforms coupled in parallel. At each platform the vehicles drive on a roadway section by electronic control and stop at the top of the double ramp and the exchange of passengers takes place as described earlier. There is no danger of passengers being hit by the vehicles as all movements at the double ramp are slow and the additional barriers will bar the entrance until the vehicle is stationary.

After boarding, the doors 13 are closed, and the automatic control system brings the vehicle down the ramp 36 and guides it on to the rail on which it is carried on.

The electronic control system calculates how many vehicles are needed in relation to the traffic requirement and combines trains matching the requirement in the best possible way.

In the example shown in FIG. 4 the station system 31 has five platforms. The size of the station system depends on the number of vehicles it is desirable to couple together. The coupling together is accomplished in an intelligent manner which is controlled by the electric control system 50, preferably according to the principle "last passenger on first passenger off". The vehicles 11 are adapted to go directly from one station to another without stopping and preferably in such a manner that all passengers leave the vehicle when the doors open.

I claim:

1. A transport system comprising:
   at least one dual-mode vehicle capable of driving on either a roadway or a railway having a cross-section, said vehicle including,
      means for selectively powering the vehicle through an onboard battery or a railway;
      a plurality of wheels for driving on a roadway;
      means for driving on the railway, the railway driving means comprising a notch along the longitudinal direction of the vehicle, wherein the notch substantially corresponds to the cross-section of the railway;
      a longitudinally extending row of seats positioned on either side of the notch; and
      at least one door positioned on each side of the notch, to in turn, facilitate access to said longitudinally extending row of seats;
   a platform arrangement comprising at least two platforms substantially positioned in parallel, each said platform including,
      a roadway section including an upwardly extending ramp and a downwardly extending ramp, and a parking area between the upwardly and downwardly extending ramps, the parking area capable of accommodating at least one said dual-mode vehicle;

a passenger platform for retaining passengers for facilitated access to the at least one dual-mode vehicle, the passenger platform positioned proximate and above the parking area of the roadway section and elevated relative to the parking area of the roadway section;

a barrier positioned between the passenger platform and the roadway section, to, in turn prevent passengers from undesirably entering the roadway section, the barrier including an opening substantially corresponding to at least one of the doors of the dual-mode vehicle; and at least one additional barrier positioned between with the roadway section and the passenger platform.

2. The transport system according to claim 1 wherein the at least one door includes a first hinge proximate a top region of the dual-mode vehicle, to, in turn, permit opening of the at least one door through an upward displacement.

3. The transport system according to claim 2 wherein the at least one door further includes a second hinge between the first hinge and a distal end of the door.

4. The transport system according to claim 1 further including an electronic control system to control each of the at least one dual-mode vehicle relative to desired positioning proximate the passenger platform and to control the additional barrier.

* * * * *

UNITED STATES PATENT AND TRADEMARK OFFICE
CERTIFICATE OF CORRECTION

PATENT NO. : 5,813,349
DATED : Sept. 29, 1998
INVENTOR(S) : Palle Rasmus Jensen

It is certified that error appears in the above-identified patent and that said Letters Patent is hereby corrected as shown below:

Col. 2, Line 15 after "However" insert a comma;

Col 2, Line 53, after "reasons" insert a comma;

Col 4, Line 20, delete "their";

Col. 4, Line 41, between "on" and "first" insert a dash;

Col. 5, Line 15, delete "with".

Signed and Sealed this

Second Day of March, 1999

Attest:

Q. TODD DICKINSON

Attesting Officer

Acting Commissioner of Patents and Trademarks